UNITED STATES PATENT OFFICE.

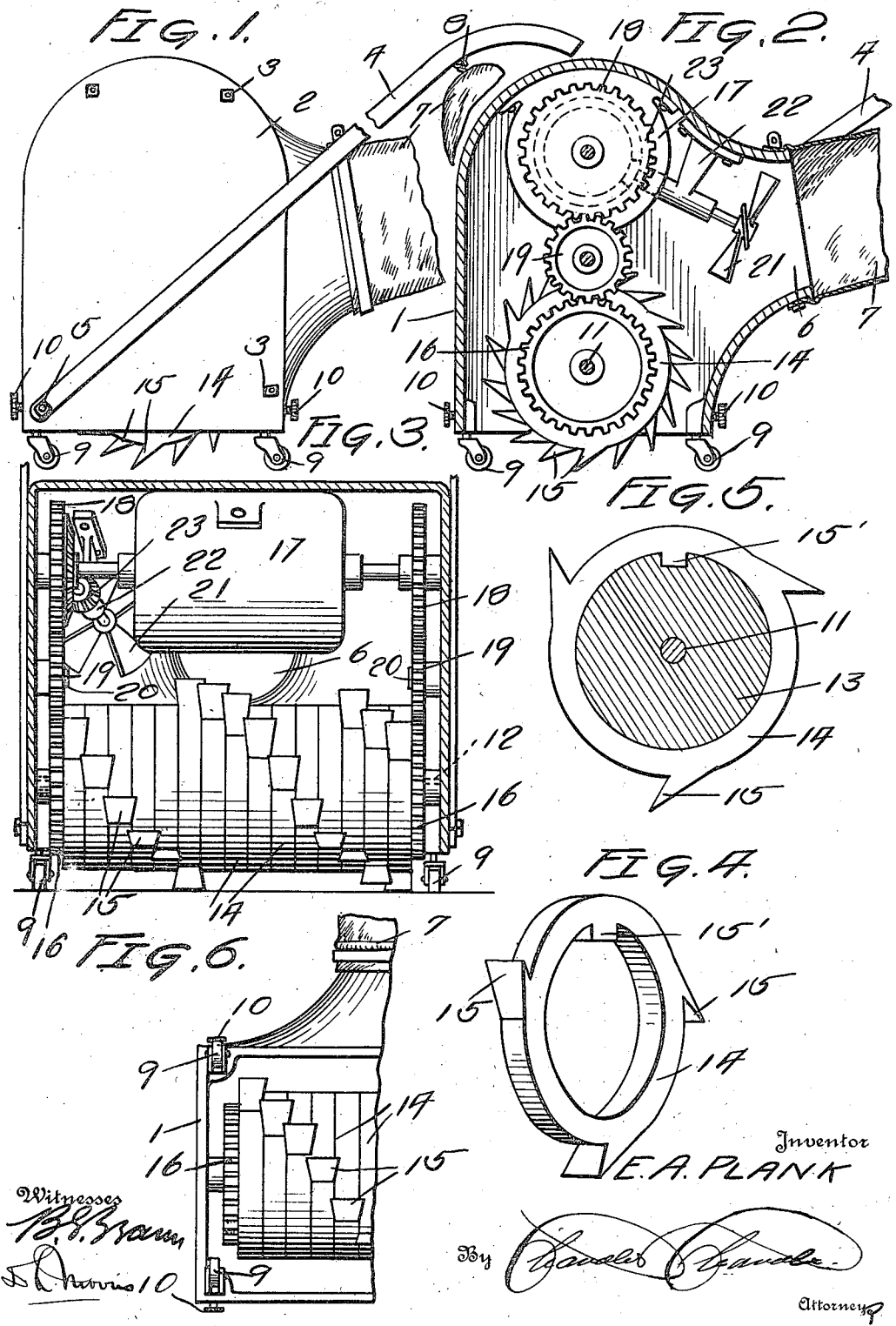

EMERSON A. PLANK, OF INDEPENDENCE, IOWA.

FLOOR-PLANING MACHINE.

1,282,285.      Specification of Letters Patent.      Patented Oct. 22, 1918.

Application filed December 21, 1915. Serial No. 68,066.

*To all whom it may concern:*

Be it known that I, EMERSON A. PLANK, a citizen of the United States, residing at Independence, in the county of Buchanan, State of Iowa, have invented certain new and useful Improvements in Floor-Planing Machines; and I do hereby declare the following to be a full, clear, and exact description of the invention, such as will enable others skilled in the art to which it appertains to make and use the same.

This invention relates to a floor planing machine.

An object of the invention resides in the provision of a machine by means of which the surface of a floor may be planed which is so constructed that the thickness of the cut may be varied at the will of the operator.

A further object of my invention resides in the provision of a device in which the cutting blades may be readily removed for sharpening.

A still further object of the invention resides in the provision of means within the device for forcing the shavings, saw dust or the like into a suitable receptacle as the floor is planed.

With these and other objects in view, such as will appear as my description progresses, my invention comprises the combination and arrangement of parts as set forth in and falling within the scope of the appended claim.

In the drawing:

Figure 1 is a side elevation of a device constructed in accordance with my invention;

Fig. 2 is a similar view with the end of the casing removed;

Fig. 3 is a vertical sectional view looking at right angles to Fig. 2;

Fig. 4 is a perspective view of one of the blade carrying rings;

Fig. 5 is a fragmental detail showing the manner in which the blade carrying rings are mounted on the rollers, and Fig. 6 is a bottom plan view.

Referring to the drawing by reference characters wherein like parts are indicated by like characters throughout the several views.

In the embodiment of the invention illustrated in the drawing, I have provided a casing 1 which is open at the bottom and is provided with a removable end 2 held in place by suitable fasteners 3. A pair of handles 4 are pivoted to the casing 1, at 5. This casing 1 is further provided with an opening 6 with which a receptacle 7, such as a bag or the like, communicates, which receptacle is secured to the handles, at 8. Mounted in the corners of the casing, at the lower end thereof, are casters 9, the shanks of which extend into openings in the casing and are slidable therein. These shanks are clamped in any of a plurality of positions by thumb screws 10, for a purpose which will later appear. A shaft 11 is rotatably mounted in removable bushings 12 in the casing 1 and a roller 13 is secured to the shaft. A plurality of rings 14 are removably mounted on the roller and each of these rings is provided with cutting blades 15, the rings being held in place by lugs 15' which extend into a longitudinally extending groove in the roller. The blades are so arranged that they will describe helical paths upon the roller. Mounted on each end of the shaft 11 is a gear 16 which is removable from the shaft but is prevented from rotating relatively thereto. These gears are prevented from moving longitudinally on the shaft when the parts are in their assembled positions by the aforementioned bushings. A motor 17 is mounted within the casing 1 and is provided with a pair of gears 18. Gears 19 are mounted on stub shafts 20 which are carried by the casing, which gears 19 are located between and mesh with the gears 16 and 18 so that when the motor is energized, the roller 13 will be actuated. Thus it will be seen that when the roller is actuated, the cutting blades 15 will operate to plane the floor and as previously described, the thickness of the cut may be varied by the adjustment of the casters.

In order that the shavings, saw dust or the like may be blown into the receptacle 7, I have provided a fan 21, the shaft of which is mounted in a bracket 22, the fan is located adjacent the opening 6 in the casing so as to force the material through the opening into the receptacle. One of the gears 18 is provided with additional teeth on the side thereof with which a pinion 23 on the end of the fan shaft intermeshes so that immediately upon the energizing of the motor, a suction will be produced into the receptacle.

It will thus be seen that I have provided a device for planing a floor which is so constructed that the thickness of the cut may be readily varied and so that all of the material removed from the floor will be blown into a suitable receptacle and thus greatly enhance the operation of the machine.

While I have illustrated and described a particular embodiment of my invention, it has merely been for the sake of convenience and I do not wish to be limited to that particular embodiment as it is obvious that numerous changes may be made in the details of construction without departing from the spirit of the invention or exceeding the scope of the appended claim.

What I claim is:

A cutter for floor planing machines comprising a hub having mounted thereon a plurality of rings, in end contact one with another, each of the rings having a plurality of cutting blades projecting from its periphery each with its cutting edge parallel with the axis of the hub and projecting at both ends beyond the ends of the corresponding ring and overlapping the paths of the cutters of the next ring.

In testimony whereof, I affix my signature, in the presence of two witnesses.

EMERSON A. PLANK.

Witnesses:
JOHN L. CHERMS,
J. J. PLANK.